United States Patent [19]

Nakata et al.

[11] 4,405,750

[45] Sep. 20, 1983

[54] COLORED CYANOACRYLATE ADHESIVE COMPOSITION

[75] Inventors: Tiaki Nakata, Ibaraki; Noriyuki Kawazoe, Motomachi; Toshio Takenaka, Toyono, all of Japan

[73] Assignees: Sumitomo Chemical Company, Ltd.; Taoka Chemical Company, Ltd., both of Osaka, Japan

[21] Appl. No.: 417,155

[22] Filed: Sep. 13, 1982

[51] Int. Cl.³ ............................................... C08L 33/14
[52] U.S. Cl. .................................... 524/717; 524/775; 524/850; 252/301.35
[58] Field of Search .............. 524/717, 775, 850, 110; 252/301.35

[56] References Cited

U.S. PATENT DOCUMENTS

| | | | |
|---|---|---|---|
| 3,699,076 | 10/1972 | Thomsen et al. | 524/719 |
| 4,016,133 | 4/1977 | Hyosu et al. | 524/717 |
| 4,062,827 | 12/1977 | Zollman | 524/718 |
| 4,125,494 | 11/1978 | Schoenberg et al. | 524/850 |
| 4,297,160 | 10/1981 | Kusayama | 156/331.1 |

FOREIGN PATENT DOCUMENTS 1192165  5/1970  United Kingdom .

*Primary Examiner*—Lewis T. Jacobs
*Attorney, Agent, or Firm*—Wenderoth, Lind & Ponack

[57] ABSTRACT

α-Cyanoacrylate adhesives of fluorescent color having incorporated therein at least one member selected from C.I. Solvent Green 5, C.I. Acid Red 50 and C.I. Acid Red 52.

4 Claims, No Drawings

COLORED CYANOACRYLATE ADHESIVE COMPOSITION

The present invention relates to novel α-cyanoacrylate adhesives. More particularly, it relates to cyanoacrylate adhesives colored with particular fluorescent dyes.

An α-cyanoacrylate having the following formula (I)

wherein R is a $C_1$-$C_{16}$ alkyl, $C_2$-$C_6$ alkenyl, $C_1$-$C_6$ alkoxy $C_2$-$C_4$ alkyl, tetrahydrofurfuryl, phenyl or cyclohexyl group, is a colorless and transparent liquid of a high fluidity at room temperature, and when coated in a thin film on the surface of substrate body and exposed to ambient atmosphere for several seconds, it rapidly hardens to form a strong solid film. Taking advantage of these properties, the compound described above is rapidly applied between two materials, whereby the materials are very strongly bonded in several to several ten seconds without applying pressure or heat. Because of such properties of α-cyanoacrylate, adhesives comprising this compound have been used as instantaneous adhesives for producing precision apparatus, electrical and electronic apparatus, etc. Further in recent years, their demand for domestic use is increasing, and they are in use for bonding various metallic articles, ceramics, glass articles, rubber articles, plastic articles and the like.

While various performances including viscosity, bonding strength, setting time and so on are required for this type of adhesive depending upon intended uses, for example the kind of materials to be bonded, the form of bonding, a period of time necessary for bonding, the property of bonded materials and the like, and for satisfying these requirements, a different kind of this type of adhesive composition is now placed on the market.

For satisfying these requirements, for example, this type of adhesive comprises 10 to 50 ppm of sulfur dioxide and 50 to 500 ppm of hydroquinone to elevate storage stability, and also comprises other stabilizers, polymerization inhibitors, thickeners, diluents, plasticizers, etc. It is therefore very desirable to have a means to distinguish various kinds of these adhesive compositions at a glance.

The well-known methods intended to distinguish the kind of these cyanoacrylate adhesives is to color the adhesives by the addition of particular dyes, for example 1-hydroxy-4-amino (or 4-arylamino)anthraquinones (British Pat. No. 1,192,165 and U.S. Pat. Nos. 3,699,076 and 4,062,827). These dyes, however, lower the bonding strength and storage stability of the cyanoacrylate adhesives.

Generally speaking, a deep coloration is favorable for discrimination or distinction but causes the staining of materials to be bonded as well as lowering of the bonding strength and storage stability. Whereas, a light coloration makes discrimination between coated area and uncoated one impossible, so that parts to be coated remain uncoated in part, or more parts than required are coated, thereby impairing the bonding strength or causing the staining of materials to be bonded.

The present inventors extensively studied to improve the foregoing defects of the conventional coloration of cyanoacrylate adhesives, and as a result, found that particular dyes having fluorescence well color the cyanoacrylate adhesives without impairing the bonding performances and storage stability thereof, and exhibit a very good visible distinguishability even in a light coloration.

An object of the present invention is to provide colored cyanoacrylate adhesives. Another object of the present invention is to provide cyanoacrylate adhesives which are easy to distinguish their kinds and coated areas from uncoated ones even in a light coloration. A further object of the present invention is to provide a method for giving fluorescence to cyanoacrylate adhesives and cyanoacrylate adhesives having fluorescence.

According to the present invention, there is provided an adhesive composition comprising an α-cyanoacrylate having the formula,

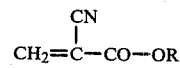

wherein R is a $C_1$-$C_{16}$ alkyl, $C_2$-$C_6$ alkenyl, $C_1$-$C_6$ alkoxy $C_2$-$C_4$ alkyl, tetrahydrofurfuryl, phenyl or cyclohexyl group, and at least one dye selected from the group consisting of C.I. Solvent Green 5, C.I. Acid Red 50 and C.I. Acid Red 52.

The α-cyanoacrylate usable in the present invention includes, for example, methyl α-cyanoacrylate, ethyl α-cyanoacrylate, propyl α-cyanoacrylate, butyl α-cyanoacrylate, amyl α-cyanoacrylate, hexyl α-cyanoacrylate, cyclohexyl α-cyanoacrylate, benzyl α-cyanoacrylate, phenyl α-cyanoacrylate, octyl α-cyanoacrylate, dodecyl α-cyanoacrylate, allyl α-cyanoacrylate, propargyl α-cyanoacrylate, methoxyethyl α-cyanoacrylate, ethoxyethyl α-cyanoacrylate, furfuryl α-cyanoacrylate, tetrahydrofurfuryl α-cyanoacrylate, chloroethyl α-cyanoacrylate, fluoroethyl α-cyanoacrylate, hexachloroethyl α-cyanoacrylate and the like. These α-cyanoacrylates may be used each alone or in combination of two or more of them.

The dyes used in the present invention, C.I. Solvent Green 5, C.I. Acid Red 50 and C.I. Acid Red 52, have structures represented by the formulae II, III and IV, respectively. These dyes are well soluble in the α-cyanoacrylates in a bright yellow having a greenish fluorescence, a bright yellowish red having a greenish fluorescence and a bright bluish red having a greenish fluorescence, respectively.

C.I. Solvent Green 5:

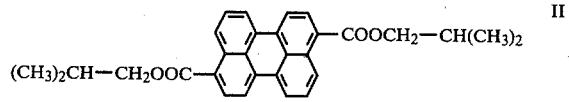

C.I. Acid Red 50:

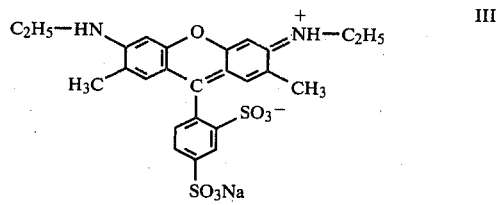

C.I. Acid Red 52:

-continued

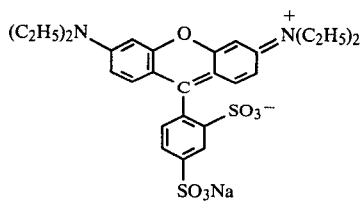

IV

These dyes may be used each alone or as a mixture of two or more.

The amount of these dyes added is 0.1 to 10000 ppm, preferably 0.5 to 2000 ppm, based on the weight of the cyanoacrylate adhesives. When the amount is less than 0.1 ppm, both coloration and fluorescence show little effect. When the amount is more than 10000 ppm, the dissolution of dye becomes difficult, and an adverse effect is sometimes exerted on the bonding strength.

Other dyes known for coloring cyanoacrylate may be used together so far as the result of the present invention is not affected, and also in this case, the fluorescence is maintained to effect the objects of discrimination and visible distinction to a sufficient extent.

In the dyes usable in the present invention are sometimes contained basic substances and other impurities caused in the course of production, and therefore in such case, it is preferred to previously wash the dyes with a very dilute aqueous acid solution (e.g. 1% hydrochloric acid), followed by drying and pulverizing.

When such dyes are used without washing, they tend to affect the storage stability of the adhesives.

The colored cyanoacrylate adhesives having fluorescence of the present invention may contain various additives used in the conventional cyanoacrylate adhesives, for example, radical polymerization inhibitors such as hydroquinone, hydroquinone monomethyl ether, catechol, pyrogallol, bisphenol A and the like (about 1 to about 10000 ppm, preferably 10 to 5000 ppm based on the weight of the adhesive), anionic polymerization inhibitors such as $SO_2$, $SOCl_2$, $SO_2Cl_2$, HF, $NO_2$, p-toluenesulfonic acid, methanesulfonic acid, propanesultone, phosphoric acid, sulfuric acid, and the like.

Further, for producing adhesive compositions having an increased viscosity, viscosity regulators such as methyl methacrylate polymer, vinyl acetate polymer, cellulose acetate isobutyrate, acrylic rubber, etc. may be incorporated in the adhesive. In addition to these, plasticizers may be added to give softness to hardened bond layer, and modifiers for giving impact strength and thermal resistance may be added.

The colored cyanoacrylate adhesives having fluorescence of the present invention have a beautiful yellow or red color having a greenish fluorescence, even when C.I. Solvent Green 5, C.I. Acid Red 50 or C.I. Acid Red 52 is used in small amounts. The adhesives of the present invention are colored without impairing bonding performances and storage stability, and therefore they are superior in the bonding performance and stability of α-cyanoacrylate itself to the conventional colored adhesives. Besides, the present adhesives are improved so that discrimination of their kinds and between coated areas and uncoated ones can easily be achieved even in a light coloration.

The colored cyanoacrylate adhesives having fluorescence of the present invention are suitable for bonding almost all the materials, i.e. rubbers, plastics, metals, woods and the like, to which the conventional instantaneous adhesives have been applied, and also preferably used, for example, in the fields of small-sized parts, construction of precision apparatus, thread-locking, sealing, artificial nail and the like.

The present invention will be illustrated in more detail with reference to the following Examples. The test items and test methods in the Examples are as follows:

VISCOSITY

Measured at 20° C. by means of a Brookfield viscometer (cps).

TENSILE SHEAR STRENGTH

The test was carried out as follows according to "Test method for cyanoacrylate adhesives" described in JIS K-6861: A test piece according to JIS G-3141 (SPCC, cold-rolled steel sheet), 100 mm×25 mm×1.6 mm in size, was polished at the surface with Sand paper AA-150 and defatted with an acetone/toluene (1:1) mixed liquor; after coating the adhesive on the surface, a pair of the test pieces were superposed so that the bond area was 25 mm×12.5 mm, pressed against each other by a force of about 2 kgf and aged as they were for 24 hours in a room of 20° C. and 60% RH; and then tensile shear strength was measured on a 5-ton capacity tensile tester, and a mean value of five tests was taken as tensile shear strength.

SETTING TIME

Test pieces were prepared for in the same manner as in the foregoing test method for tensile shear strength. After coating the adhesive so that the bond area was 25 mm×12.5 mm, the test pieces were superposed and pressed against each other by a force of about 2 kgf. According to the lapse of time, the bonded test piece was fixed at the upper end by jig, and a weight of 5 kg was put on the lower end of the test piece to apply tensile load. Thus, a period of time from the bonding to the time when the test piece no longer showed bonding break, was measured, and taken as a setting time.

STORAGE STABILITY

After storing at 70° C. for 7 days, the viscosity, tensile shear strength and setting time were measured in the manner described above.

EXAMPLES 1 TO 5 AND COMPARATIVE EXAMPLES 1 AND 2

C.I. Solvent Green 5 in an amount (ppm) shown in Table 1 was dissolved in ethyl α-cyanoacrylate containing 15 ppm of $SO_2$ and 500 ppm of hydroquinone. Either of the adhesive compositions obtained had a greenish fluorescence and a bright yellow color. These adhesives were examined for bonding performances and storage stability in comparison with non-colored adhesives, and the results are as shown in Table 1.

During these tests in which the colored adhesives and non-colored ones were coated on steel plate, each coated state was observed. With the former ones, the boundary of coating was clearly recognized irrespective of the depth of coloration. While with the latter ones, the boundary of coating was hardly recognized. In the room of poor illumination, the boundary of coating was little recognized for both the colored and non-colored adhesives, but on irradiation with black light, it was able to be recognized very clearly for the colored adhesives because of a bright greenish fluorescence.

ethyl α-cyanoacrylate containing 15 ppm of $SO_2$ and 500 ppm of hydroquinone. The adhesives obtained had

TABLE 1

| Exp. No. | Amount of dye added (ppm) | Initial stage | | | Storage stability | | |
|---|---|---|---|---|---|---|---|
| | | Viscosity | Tensile shear strength | Setting time (sec) | Viscosity | Tensile shear strength | Setting time (sec) |
| Example 1 | 5 | 2.5 | 202 | 45 | 3.0 | 196 | 60 |
| Example 2 | 100 | 2.5 | 211 | 45 | 3.0 | 203 | 60 |
| Example 3 | 500 | 2.5 | 207 | 45 | 3.0 | 208 | 60 |
| Example 4* | 500 | 60 | 201 | 70 | 110 | 204 | 70 |
| Example 5 | 1000 | 2.5 | 212 | 50 | 3.0 | 210 | 60 |
| Comparative Example 1 | None | 2.5 | 205 | 45 | 3.0 | 219 | 60 |
| Comparative Example 2* | None | 60 | 207 | 60 | 100 | 212 | 75 |

Note:
Each adhesive of Example 4 and Comparative Example 2 additionally comprises 10 parts by weight based on 100 parts by weight of the adhesive (PHR) of methyl methacrylate polymer.

EXAMPLES 6 TO 12 AND COMPARATIVE EXAMPLES 3 AND 4

C.I. Acid Red 50 and C.I. Acid Red 52 in amounts as shown in Table 2 were dissolved in methyl α-cyanoacrylate containing 15 ppm of $SO_2$ and 200 ppm of hydroquinone. Either of the adhesive compositions obtained had a greenish fluorescence and a bright red color.

The foregoing both dyes were treated before use as follows: Five grams of the crude product of them was dispersed in 200 ml of 1% aqueous hydrochloric acid solution, stirred for 30 minutes for washing, filtered, dried at 80° C. for 24 hours and then pulverized.

The results about the bonding performances and storage stability are as shown in Table 2.

The coated state on steel plate was observed, and it was found that either of the colored adhesives was clearly recognized, but with the non-colored ones, the boundary of coating was undistinguishable. In a dark place, both the adhesives were invisible, but on irradiation with black light, the colored ones only emitting a beautiful greenish fluorescence could clearly be recognized.

a color as shown in Table 3, but fluorescence.

These colored adhesives were examined and the results are as shown in Table 3.

TABLE 3

| Comparative Example No. | Name of dye | Color | Storage stability | |
|---|---|---|---|---|
| | | | Tensile shear strength | Viscosity |
| 1 | Non | Non | 209 | 105 |
| 5 | 5-Amino-4-anilino-1,8-dihydroxy-anthraquinone | Blue | 204 | 410 |
| 6 | 1-Hydroxy-3-bromo-4-amino-anthraquinone | Red | 151 | 110 |
| 7 | 2-(3-Hydroxy-2-quinolinyl)-1H-indene-1,3(2H)-dione | Yellow | 140 | 105 |
| 8 | 4-p-Anisidino-1-hydroxy-anthraquinone | Purple | 186 | 260 |

What is claimed is:
1. An adhesive composition comprising an α-cyanoacrylate having the formula,

TABLE 2

| Exp. No. | Amount of dye added | | Initial stage | | | Storage stability | | |
|---|---|---|---|---|---|---|---|---|
| | C.I. Acid Red 50 | C.I. Acid Red 52 | Viscosity | Tensile shear strength | Setting time (sec.) | Viscosity | Tensile shear strength | Setting time (sec.) |
| Example 6 | 5 | — | 2.5 | 201 | 45 | 3.0 | 196 | 45 |
| Example 7 | 500 | — | 2.5 | 207 | 45 | 3.0 | 206 | 45 |
| Example 8 | 1000 | — | 2.5 | 203 | 45 | 3.0 | 207 | 45 |
| Example 9 | — | 5 | 2.5 | 198 | 45 | 3.0 | 207 | 45 |
| Example 10 | — | 500 | 2.5 | 206 | 45 | 3.0 | 206 | 45 |
| Example 11* | — | 500 | 60 | 199 | 60 | 130 | 200 | 60 |
| Example 12 | — | 1000 | 2.5 | 201 | 45 | 3.0 | 203 | 45 |
| Comparative example 3 | — | — | 2.5 | 205 | 45 | 3.0 | 209 | 45 |
| Comparative example 4* | — | — | 60 | 207 | 60 | 100 | 200 | 60 |

Note:
Each adhesive of Example 11 and Comparative Example 4 additionally comprises 10 parts by weight based on 100 parts by weight of the adhesive (PHR) of methyl methacrylate polymer.

COMPARATIVE EXAMPLES 5 TO 8

Two hundred ppm of each of the dyes described in U.S. Pat. Nos. 3,699,076 and 4,062,827 was dissolved in

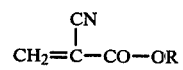

wherein R is a $C_1-C_{16}$ alkyl, $C_2-C_6$ alkenyl, $C_1-C_6$ alkoxy $C_2-C_4$ alkyl, tetrahydrofurfuryl, phenyl or cyclohexyl group, and at least one dye selected from the group consisting of C.I. Solvent Green 5, C.I. Acid Red 50 and C.I. Acid Red 52.

2. The adhesive composition according to claim 1, wherein the content of the dye is 0.1 to 10000 ppm based on the weight of the adhesive composition.

3. The adhesive composition according to claim 1, wherein the composition additionally comprises at least one member selected from the group consisting of polymerization inhibitors, viscosity regulators, plasticizers and impact strength modifiers.

4. Materials bonded with the adhesive composition of claim 1.